B. W. BENBOW.
RECORDING COMPASS.
APPLICATION FILED OCT. 9, 1916.
1,256,430.
Patented Feb. 12, 1918.
2 SHEETS—SHEET 1.
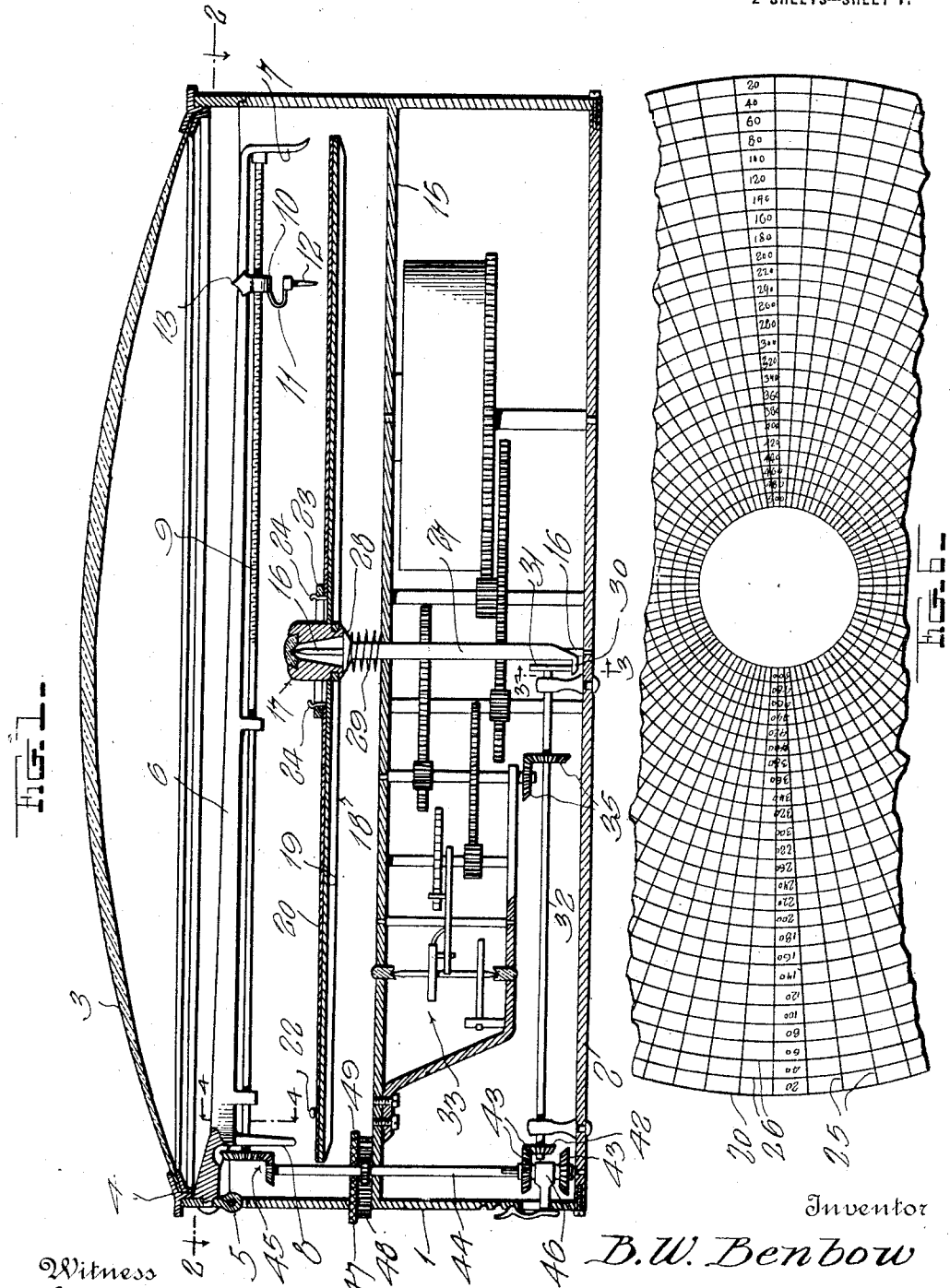
Witness
H. Woodard
Inventor
B. W. Benbow
By H. B. Willson &co
Attorneys

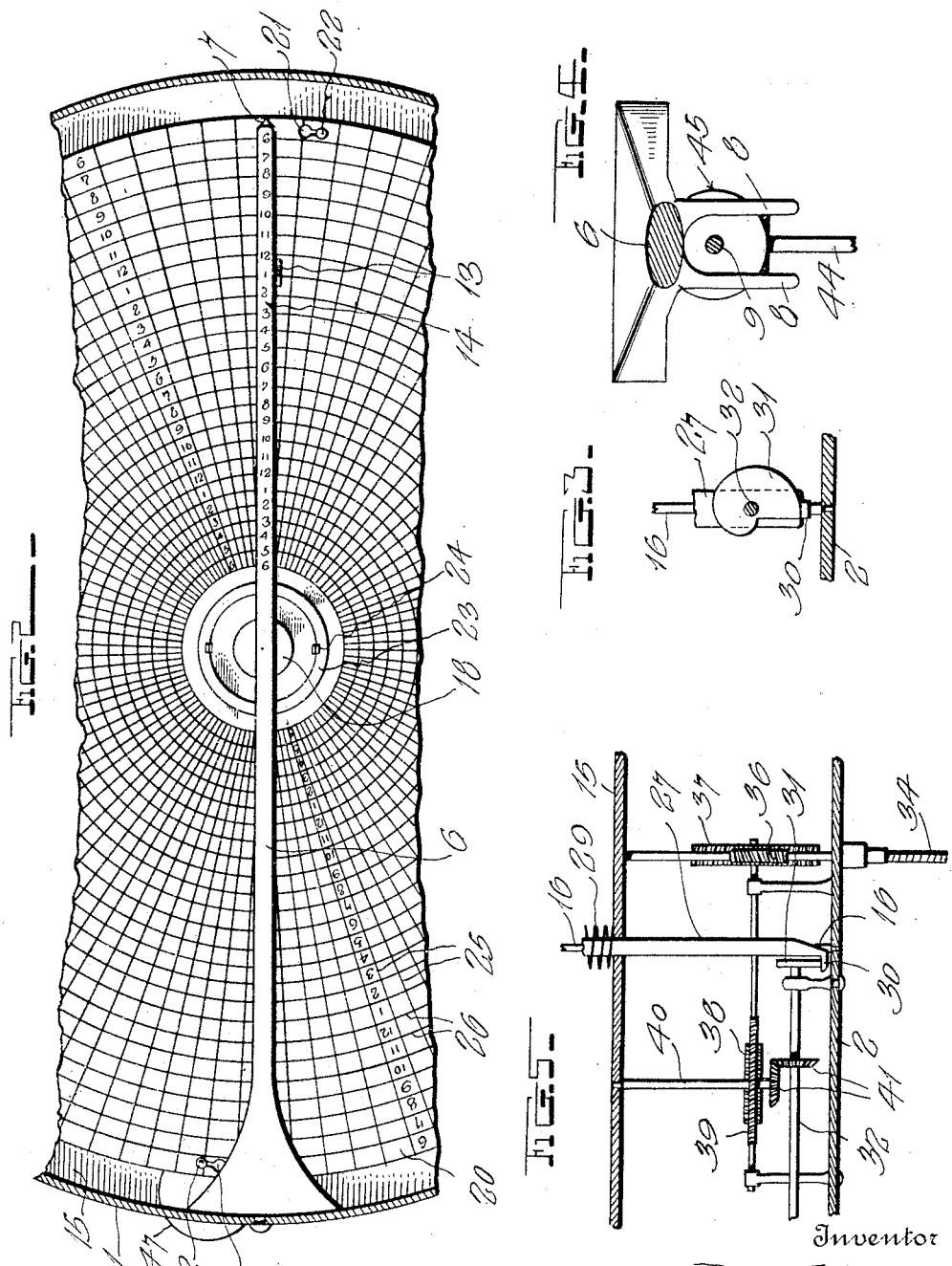

UNITED STATES PATENT OFFICE.

BURTIS WILLIAM BENBOW, OF EUREKA, CALIFORNIA.

RECORDING-COMPASS.

1,256,430.  Specification of Letters Patent.  Patented Feb. 12, 1918.

Application filed October 9, 1916. Serial No. 124,586.

*To all whom it may concern:*

Be it known that I, BURTIS W. BENBOW, a citizen of the United States, residing at Eureka, in the county of Humboldt and State of California, have invented certain new and useful Improvements in Recording-Compasses; and I do declare the following to be a full, clear, and exact description of the invention, such as will enable others skilled in the art to which it appertains to make and use the same.

My invention aims to provide an improved type of apparatus to be used primarily in connection with mariners' compasses for recording the course taken by a vessel, giving the number of degrees which the vessel turns at each change in the direction of the course and also recording either the number of hours traveled or the number of miles.

With the foregoing general object in view, the invention resides in certain novel features of construction and in unique combinations of parts to be hereinafter fully described and claimed, the descriptive matter being supplemented by the accompanying drawings which constitute a part of this application and in which:

Figure 1 is a vertical section of the invention;

Fig. 2 is a horizontal section on the plane of the line 2—2 of Fig. 1;

Fig. 3 is a detail vertical section on the plane of the line 3—3 of Fig. 1, showing more particularly the shape of the operating cam;

Fig. 4 is another detail vertical section on the plane indicated by the line 4—4 of Fig. 1;

Fig. 5 is an elevation showing the manner in which the operating cam may be actuated from the ship's log;

Fig. 6 is a fragmentary elevation of a mile dial which may be used.

In the drawings above briefly described, the numeral 1 designates a circular compass case having a solid bottom 2 which may be detached when necessary, and a glass top 3 carried by a frame 4 which is hinged at 5 to the case 1.

A horizontal pointing arm 6 is secured rigidly at one end to the frame 4 and at its other end is extended downwardly in the form of a finger 7, the fixed inner end of said pointing arm being also equipped with fingers designated by the numeral 8, the several fingers being designed for a purpose to appear.

A horizontal screw 9 is rotatably supported by suitable bearings with which the indicating arm 6 is provided, said screw passing through a nut 10 which is connected by means of a spring 11 with a suitable marking device 12, said nut being also provided with a pointer 13 coöperating with a scale 14 on the upper side of the arm 6. If the device is to be driven from a horologue the scale 14 will represent hours but if the apparatus is to be actuated from the ship's log a mile scale will be employed.

The case 1 is provided with a horizontal partition 15 through which a vertical staff 16 rises from the bottom 2, said staff supporting thereon a jeweled bearing 17 at the center of a magnetic compass needle 18. The needle 18 carries a horizontal disk 19 of aluminum or other light material, said disk being adapted to support thereon a record card or dial 20. The edge of dial 20 will be preferably provided with keyhole slots 21 receiving headed studs 22 which rise from the disk 19 whereby when the larger ends of the slots 21 are passed over the heads of said studs, turning of the dial will locate the shanks of the studs in the smaller ends of the slots 21 that the dial will be held in operative position upon the disk 19. A ring 23 preferably rests on the center of the dial 20 around a central opening therein and is held in place by a plurality of vertical springs 24 which rise from the disk 19.

The dial 20 has on its upper face a plurality of radial lines 25 representing degrees and is also inscribed with concentric lines 26. The lines 26 will represent hours when the device be driven from a horologue and miles when it is operated from the ship's log. (See Figs. 2 and 6 respectively).

A tubular thrust member 27 slidably and non-rotatably surrounds the staff 16 and is provided at its upper end with a head 28 disposed immediately beneath the bearing 17, a coiled spring 29 being interposed between said head and the partition 15. The lower end of the thrust member 27 is equipped with a laterally extending projection 30 with which an operating cam 31 coöperates. The cam 31 is secured on a horizontal shaft 32 rotatably mounted in the lower side of the case 1 and this shaft may be driven by means of a nonmagnetic horologue 33 beneath the partition 15 or as shown in Fig. 5 it may be driven from a flexible shaft or the like 34 which is rotated by the ship's log. If the horologue 33 is to be used, intermeshing pinions 35 will drive the shaft 32 but if the ship's log is to operate the device the shaft 34 will carry a worm 36 meshing with a worm gear 37 secured on one end of another worm 38, the last named worm meshing with a second worm gear 39 in turn secured on a vertical shaft 40, the latter driving the shaft 32 by means of bevel gears 41 or other suitable means. Either drive will serve at intervals of one minute or any other appropriate length to successively release the thrust member 27 to permit the spring 29 to exert its tension to move the needle 18 upwardly to bring the dial 20 in contact with the device 12. By means of the screw 9 and driving connections yet to be described between the shaft 32 and the screw 9, the latter now moves the marking device 12 radially and thus places successive marks on the dial 20 as the latter is alternately raised by the spring 29 and lowered by the cam 31.

Any suitable means may be employed for driving the screw 9 from shaft 32, but the latter preferably is equipped with a bevel gear 42 coöperating with either of a pair of bevel gears 43 which are slidably keyed on a vertical shaft 44 connected with screw 9 by means of bevel gears 45, a slide 46 being employed for shifting either of the gears 43 into mesh with 42 or for holding said gears in neutral position. It will thus be evident that the screw 9 may be rotated in either direction from shaft 37 or that by disposing the gears 43 in neutral, driving connections between said shaft and screw will be severed. This is only done when manual adjustments are to be made at the beginning of a trip. For making such adjustments a serrated wheel 47 extends through a slot in one side of the casing and by means of a gear 48 and pinion 49, turning of said wheel will rotate the shaft 44 to in turn drive the screw 9 and move the marking device 12 inwardly or outwardly as occasion may demand.

In operation, the dial will be placed on disk 19 and the marking device 12 will be properly set by turning the wheel 47 after locating the slide 46 in its neutral position. This having been done, the slide is again operated to throw the proper gear 43 into mesh with 42 and as the vessel now travels on its course the continually rotating cam 31 will alternately release and depress the thrust member 27, thus permitting the spring 29 to successively raise the needle 18 and the disk 19 to bring the dial 20 into contact with the marking device 12 which is being slowly moved in a radial direction by means of the worm 9. It will thus be obvious that the course of the vessel will be accurately recorded on the dial 20, all turns and angles being properly represented since the entire compass case in turning around the needle when making such turns and angles will cause the device 12 to travel between different radial lines. For instance, if the course veers forty-five degrees in one hour's time or in say, one mile, at the completion of this distance or period the device 12 will mark at a point forty-five degrees from that at which it was recording before the turn was made.

When a course recorded in the manner described is to be retraced, the gear 43 which was previously idle is thrown into mesh and the marking device 12 on the return trip only serves as an indicator to be kept over the marks made on the preceding trip.

The upward thrusts of the member 27 may occur at proper intervals but preferably said member will be moved upwardly every minute and whenever it is raised, the fingers 7 and 8 will hold the dial in proper position to permit the device 12 to perform its work.

From the foregoing, taken in connection with the accompanying drawings, it will be obvious that although the invention is of rather simple nature it will be highly efficient and durable. For these reasons, the construction shown and described constitutes the preferred form of the apparatus but it is to be understood that within the scope of the invention as claimed, numerous changes may be made without sacrificing the principal advantages and although the device has been described for use on a vessel, it will be obvious that it can be employed wherever applicable.

I claim:

1. A recording compass comprising a magnetic compass needle, a record card carried thereby, a marking device spaced above said card, means for moving said marking device, and means for relatively shifting the needle and the marking device to bring the card into contact with said marking device.

2. A recording compass comprising a magnetic compass needle, a record card carried thereby, a marking device spaced above said card, means for moving said marking device, a vertically movable thrust member for raising and lowering the needle alternately to bring the card successively into contact with the marking device, and means for alternately raising and lowering said thrust member.

3. A recording compass comprising a magnetic compass needle, a record card carried thereby, a marking device spaced above said card, means for moving said marking device, a vertically movable thrust member for raising and lowering the needle alternately to bring the card successively into contact with the marking device, a spring for raising said thrust member, and a driven cam for lowering said member against the tension of the spring and releasing it at intervals.

4. A recording compass comprising a magnetic compass needle, a record card carried thereby, a marking device spaced above said card, means for moving said marking device, a vertical thrust member, a spring for raising said member to shift the compass needle upwardly to bring the card in contact with the marking device, and means for returning said thrust member to its normal position after each upward thrust thereof.

5. A recording compass comprising a magnetic compass needle, a record card carried thereby, a marking device spaced above said card, means for moving said marking device, a vertical thrust member, means for raising said member to shift the compass needle upwardly to bring the dial in contact with the marking device, and a driven cam for returning said thrust member to its normal position after each upward thrust thereof.

6. A recording compass comprising a magnetic compass needle, a marking device spaced above said needle, a record card carried by said needle, a screw for moving said marking device, means for moving the needle to bring the card successively in contact with the marking device, a driven shaft for controlling said means, and driving connections between said shaft and the aforesaid screw.

7. A recording compass comprising a magnetic compass needle carrying a record card and means for alternately raising and lowering said needle and dial; in combination with a rigid indicating arm above the card, a marking device adjacent said arm for placing a record on said card, and a plurality of fingers depending from said arm to prevent tilting of the dial while the marking device is in operation.

8. A recording compass comprising a magnetic compass needle carrying a record card and means for alternately raising and lowering said needle and card in combination with a marking device spaced above said card for recording thereon, and means for preventing tilting of the card while said marking device is in operation.

In testimony whereof I have hereunto set my hand in the presence of two subscribing witnesses.

BURTIS WILLIAM BENDOW.

Witnesses:
 JOHN F. FOUCH,
 CHAS. THODE.

Copies of this patent may be obtained for five cents each, by addressing the "Commissioner of Patents, Washington, D. C."